April 10, 1945.  H. T. HUGHES  2,373,312
FASTENER
Filed June 11, 1943  2 Sheets-Sheet 1
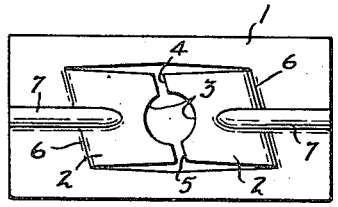
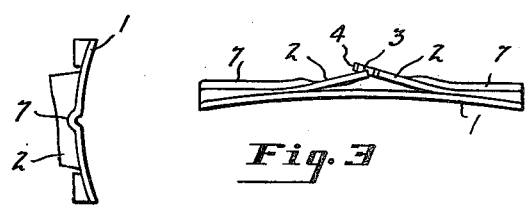
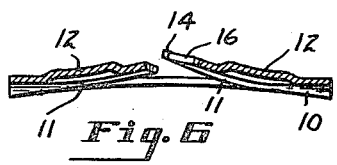
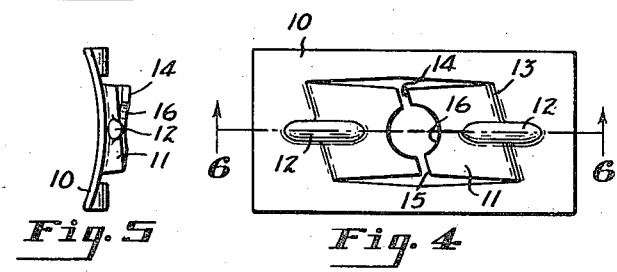
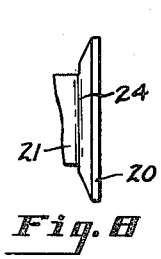
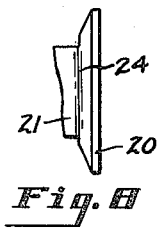
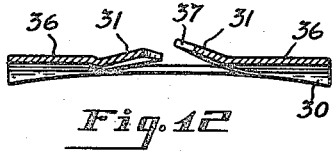
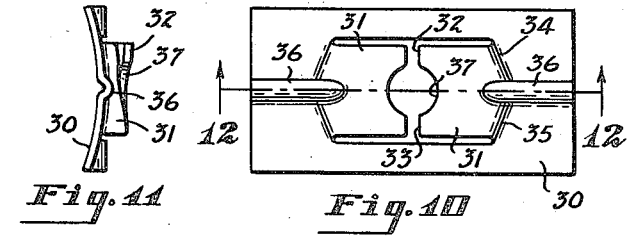
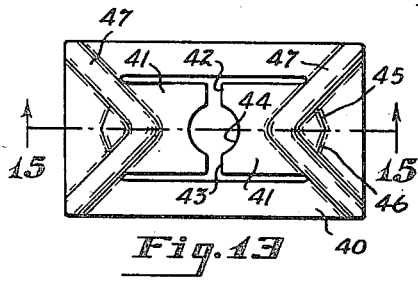
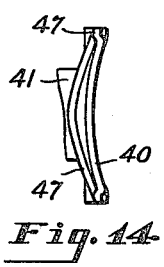
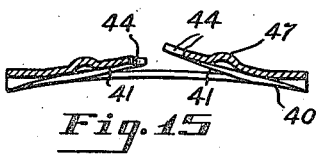
INVENTOR
Hugh T. Hughes
BY O. Z. McCoy
ATTORNEY April 10, 1945.  H. T. HUGHES  2,373,312
FASTENER
Filed June 11, 1943  2 Sheets-Sheet 2
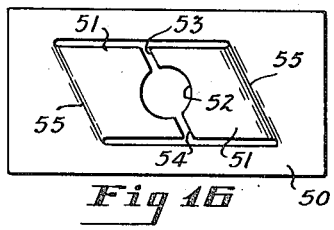
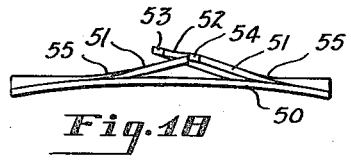
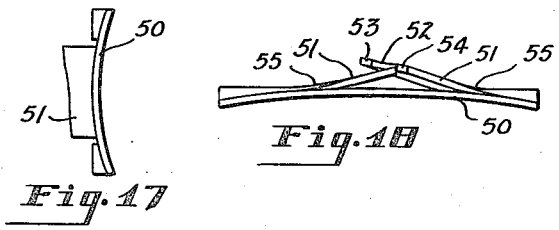
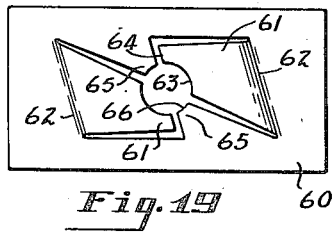
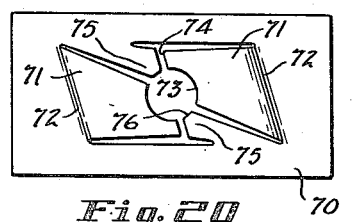
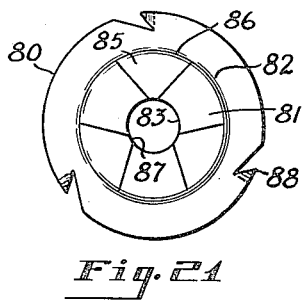
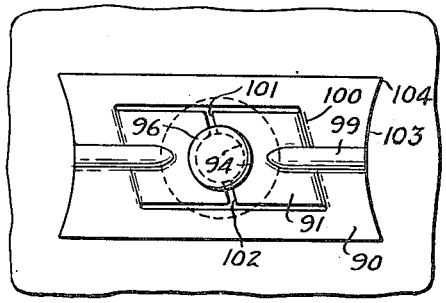
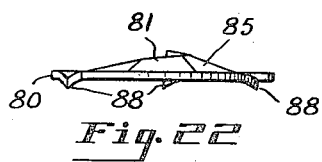
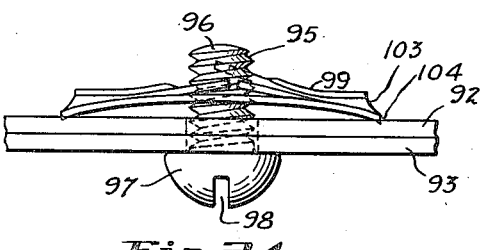
INVENTOR
*Hugh T. Hughes*
BY *O. Z. McCoy*
ATTORNEY Patented Apr. 10, 1945

2,373,312

UNITED STATES PATENT OFFICE 2,373,312

FASTENER

Hugh T. Hughes, Cleveland, Ohio, assignor of one-half to Orlin F. Goudy, Cleveland, Ohio Application June 11, 1943, Serial No. 490,401

13 Claims. (Cl. 85—36)

This invention relates to fasteners and more particularly to sheet metal fasteners for engaging bolts, screws, pins, studs and the like in the securing of parts of a device together.

An object of the present invention includes the provision of a new and improved sheet metal fastener comprising tongue portions of the cantilever bridge type that are tilted and strengthened in advantageous portions thereof to provide improved functional advantages where most needed without increase in the costs of manufacture. Another object includes an improved construction in which fastener tongue portions are struck up from a body portion of the fastener to provide opposed unattached tongue ends that are inclined with respect to the body portion of the fastener to conform substantially with a desired pitch of threads upon a bolt shaft as determined by the inclination of bend lines disposed at the ends of the tongues that are attached to the body portion of the fastener and which unattached ends of the fastener tongue portions terminate laterally in tips at different distances from the ends of the fastener which construction imparts new and improved inclination to the free ends of the tongues that adapts the inclination of the free ends of the tongue portions to the pitch of the threads upon the particular bolt with which the fasteners are to be used to better impart resistance to the thrust and torque forces to which the tongues are subjected. My invention also contemplates a structure in which the tongues are provided with a curved edge between the tips for being disposed between and which substantially conform with the pitch of adjacent threads upon a particular bolt engaged by the fastener and a body portion provided with sharp means that are designed to bite into the metal of the support upon which the fastener is used to thereby minimize the slipping of the fastener with respect to the support as the bolt is rotated and tightened upon the fastener.

With the above and other objects in view that will be apparent to those who are informed regarding the class of devices to which the present invention belongs from the following discussion, illustrative embodiments of the present invention are disclosed in the accompanying drawings wherein:

Fig. 1 is a plan view of a cambered fastener that embodies the present invention with reinforcing and stiffening means overlying the bend lines at the junction of the tongue and body portions thereof;

Fig. 2 is an end view of the fastener that is shown in Fig. 1;

Fig. 3 is a side view of the fastener that is shown in Fig. 1;

Fig. 4 is a plan view of a cambered fastener that is reinforced across the bent junction of the tongues with the body of the fastener to stiffen the relation therebetween;

Fig. 5 is an end view of the fastener that is shown in Fig. 4;

Fig. 6 is a section taken along the line 6—6 of Fig. 4;

Fig. 7 is a plan view of a fastener having a body portion that is cambered both longitudinally and transversely by bends extending inwardly from the corners thereof;

Fig. 8 is an end view of the fastener that is shown in Fig. 7;

Fig. 9 is a section taken along the line 9—9 of Fig. 7;

Fig. 10 is a plan view of a fastener wherein the tongue portions join the body portion in centered bends that are reinforced with means that extend longitudinally of the device across the bends therein;

Fig. 11 is an end view of the fastener that is shown in Fig. 10;

Fig. 12 is a section taken along the line 12—12 of Fig. 10;

Fig. 13 is a plan view of a fastener wherein the tongue portions join the body portion in centered bends that are reinforced with ribs that originate at the corners of the body portion and join within the tongues on the mid-line thereof;

Fig. 14 is an end view of the fastener that is shown in Fig. 13;

Fig. 15 is a section taken along the line 15—15 of Fig. 13;

Fig. 16 is a plan view of a fastener of a double cambered construction and with the tongue portions terminating in ends spaced different distances along the circumference of the bolt and equidistant from the bend at the junctions of the tongues with the body portion of the fastener;

Fig. 17 is an end view of the fastener that is shown in Fig. 16;

Fig. 18 is a lateral view of the fastener that is shown in Fig. 16;

Fig. 19 is a plan view of a fastener with tongue portions terminating in lateral tips spaced different distances along the circumference of the bolt to be engaged by the fastener and supplemented by auxiliary stub tongues;

Fig. 20 is a plan view of a fastener similar to that shown in Fig. 19 with increased resilience imparted to the stub tongues by the extension for a desired distance of the lateral slots that separate part of the stub tongues from the fastener body portion;

Fig. 21 is a plan view of a circular fastener having a plurality of laterally expanded tongue portions and downwardly extending spurs for embedding themselves into a soft metal mounting for the fastener and retarding the rotation of the fastener when the bolt is tightened;

Fig. 22 is an edge view of the fastener that is shown in Fig. 21;

Fig. 23 is a plan view of a mounted fastener having curved end edges that provide spurs for embedding themselves in the fastener mounting when the bolt is drawn tightly; and Fig. 24 is an edge view of the mounted fastener that is shown in Fig. 23.

All of the fasteners that are illustrated and disclosed herein are preferably double cambered so that when the bolt upon which the fastener is mounted is tightened thereon the compression or strut action to which the tongue portions of the fasteners are subjected are opposed by tensile forces distributed along the peripheries of the fasteners. The tongue portions of the fasteners that are disclosed herein are oppositely inclined with respect to each other to assume the inclination of the spiral threads upon the bolts for which the fasteners are primarily intended to be used.

The first form of fastener that is illustrated in Figs. 1 to 3 of the accompanying drawings comprises a body portion 1 that is die cut to provide the opposed tongue portions 2. The tongues 2 terminate at their free ends in curved edges 3 and lateral tips 4 and 5 that are equidistant from the bend lines 6 at the junction of the body portion 1 and the tongues 2. The bend lines 6 are inclined with respect to the longitudinal midline of the tongues 2 or to the edges of the body portion 1. This relation inclines the free ends of the tongues to substantially conform to the pitch of the threads of a bolt with which the fasteners are used, thus enabling the bolt to advantageously oppose the strut and torque forces that are transmitted by the tongues 2 to the body 1 when the fastener is tightened by the rotation of the bolt upon which it is mounted. Elevations, depressions, or the ribs 7 stiffen the tongues 2 with respect to the body portion 1 of the fastener, against both bending and torque forces to which the tongues 2 are subjected when the fastener is tightened upon a bolt. The opposite ends of the fasteners are symmetrical in construction. The ribs 7 preferably extend from the ends of the fastener across the bend lines 6 and terminate at desired points in the tongues 2. The double cambered construction is accomplished by a shaping operation that imparts a uniform arch both longitudinally and transversely of the fastener. As a result of this double cambered construction, the corners of the fastener present corner points to the support, not shown in this figure, that may embed the corner points into the support, where the fastener is of harder metal than the support, and minimize the rotation of the fastener with respect to the support. The tongues 2 are inclined oppositely with respect to each other so that their curved edges 3 seat between adjacent threads on a bolt that may be engaged by the fastener. The curved edges 3 of the tongues 2 are designed to terminate in their engagement with a bolt along a diameter of the bolt that is inclined with respect to the end and side edges of the fastener and to impart balanced opposed torque forces from the tongues 2 thru the body 1 to the support.

The next form of fastener shown in Figs. 4 to 6 comprises a body portion 10, the opposed tongue portions 11 that are stiffened in their relation with the body portion 10 by elevations, depressions or ribs 12, that extend longitudinally of the fastener across the tongue bend lines 13 and terminate a desired distance on either side thereof and, in the construction shown, short of the end edges of the fastener. In this construction also the tongue bend lines 13 and the tips 14 and 15 of the tongues 11 are disposed along lines that are substantially parallel with each other and that are inclined with respect to the midline of the tongues or to the side and end edges of the fastener so that the edges of the free ends of the tongues substantially conform with the pitch of the threads upon bolts with which the fasteners are to be used. The curved edges 16 of the tongues 11 are adapted for engaging a bolt between adjacent threads thereof. This fastener also is cambered preferably both longitudinally and transversely thereof as shown.

The third form of fastener that is shown in Figs. 7 to 9 of the accompanying drawings comprises a body portion 20 that is die cut to provide opposed tongue portions 21 that terminate in tips 22 and 23 that extend along a line that is substantially parallel with the tongue bend line 24 at the junctions of the tongues 21 with the body 20 and inclined with respect to the end and side edges of the fastener. In this construction the tongue bend lines 24 but slightly alter the inclination of the tongues 21 because of the degree of camber pitch of the ends of the body portion 20. Short body bends 25 and long body bends 26 extend from the respective corners of the fastener to the respective terminations of the bend lines 24 at the junction of the tongues 21 with the body 20, to impart the desired double camber to the fastener. The body bends 25 and 26 divide the body 20 into a plurality of flat surfaces as compared with the previously described curved constructions. The free ends of the tongues 21 provide the bolt thread engaging tongue curved edges 27 disposed between the tongue tips 22 and 23 and inclined in conformity with the inclination of the bend lines 24 to adapt the fastener to a bolt having threads of a particular pitch.

The fourth form of fastener that is shown in Figs. 10 to 12 of the drawings comprises a body portion 30 that is die cut to provide the tongue portions 31. The tongues 31 terminate at their free ends in the tips 32 and 33 that extend along lines that, in this modification, are substantially parallel with respect to the end edges of the fastener altho they may, if preferred, be inclined thereto as in the previously described constructions. The bend lines 34 and 35 at the junctions of each tongue 31 with the body 30, converge toward the longitudinally disposed median line of the fastener to assist in centering the compression and torque forces to which the tongues 31 are subjected when the fastener is drawn tightly upon a bolt. Elevations, depressions or ribs 36 are disposed along the longitudinally median line of the fastener and extend longitudinally thereof to overlie the junctions of the tongues 31 with the body 30 of the fastener to stiffen and strengthen the junctions therebetween. The curved edges 37 at the free ends of the tongues 31 are designed to engage a bolt between adjacent threads thereof as in the previously described modifications.

The fifth form of fastener that is shown in Figs. 13 to 15 of the drawings comprises a body portion 40 that is die cut to provide the tongue portions 41 that terminate at their free ends in the tips 42 and 43 between which are disposed the curved edges 44 for engaging a bolt by being disposed between adjacent threads thereof. The tongue tips 42 and 43 are shown to be substantially parallel with the ends of the body portion 40 altho they may be inclined thereto as in the previously described constructions if desired. The forces to which the tongues 41 are subjected when the fastener is drawn tightly against a support by the rotation of a bolt upon which the fastener may be mounted, are preferably centered with respect to the tongues 41 by the bend lines 45 and 46 that are inclined with respect to the mid-lines of the tongues 41 or to the edges of the fastener so that the bend lines 45 and 46 intersect at substantially the longitudinal mid-line of the fastener. The ribs 47 originate at the corners of the fastener, cross the bend lines 45 and 46 and intersect substantially on the longitudinal mid-line of the fastener and within the tongues 41 so that they stiffen and strengthen the junctions between the tongues 41 and the body 40 parts of the fastener. This form of fastener is also provided with the desired camber both longitudinally and transversely of the fastener as shown.

The fastener that is shown in the Figs. 16–18, inclusive, of the drawings comprises a body portion 50 that is die cut to provide the tongue portions 51. The fastener is cambered both transversely and longitudinally by being arched as shown. The tongues 51 terminate at their free ends in the curved edges 52 that engage a bolt by being interposed between adjacent threads thereof and in the tongue tips 53 and 54. The tongue tips 53 and 54 extend in a direction that is substantially parallel with the bend lines 55 at the junctions of the tongues 51 with the body 50 and inclined with respect to the mid-lines of the tongues 51 and to the edges of the fastener to impart a desired inclination to the free ends of the tongues 51 substantially conforming with a thread pitch with which the fasteners are to be used.

The form of fastener that is shown in Fig. 19 of the drawings comprises a body portion 60 that is die cut to provide tongue portions 61 that join the body 60 at the bend lines 62 and that terminate at their free ends in the curved edges 63 and the tips 64, and to provide the supplemental stub tongues 65. The curved edges 63 of the tongues 61 are designed to engage a bolt between adjacent threads thereof with an inclination substantially conforming with the thread pitch thereof as determined by the inclination of the bend lines 62. The tongue tips 64 extend in a direction that is substantially parallel with the bend lines 62 and are designed to be disposed on the side of a bolt or beyond a bolt diameter extending parallel with the end edges of the fastener. The stub tongues 65 terminate in the curved tips 66 that also dispose themselves between adjacent threads upon a bolt upon which the fastener may be used. As in the previously described constructions this fastener is preferably cambered both longitudinally and transversely thereof.

The fastener that is shown in Fig. 20 of the accompanying drawings, comprises a body portion 70 that is die cut to provide tongue portions 71 that join the body 70 along the bend lines 72 and terminate at their free ends in the bolt thread engaging curved edges 73 and the tip edges 74 and to provide stub tongue portions 75. The stub tongues 75 terminate in the curved edges 76 for engaging bolt threads. The stub tongues 75 are made more resilient than the stub tongues 65 of the last described construction by the extension to a desired distance of the cut that is disposed longitudinally of the fastener and substantially parallel with the lateral edges thereof. This construction is also preferably cambered both longitudinally and transversely thereof.

The fastener that is shown in Figs. 21 and 22 of the drawings comprises a body portion 80 that is die cut to provide broad tongue portions 81 that join the body 80 along the bend lines 82 and that terminate at their free ends in the curved edges 83 and to provide wedge-shaped tongues 85 interposed between pairs of the tongues 81. The wedge-shaped tongues 85 join the body 80 along the bend line 86 and terminate at their free ends in narrow edges 87 that also are designed to be disposed between adjacent threads on a bolt upon which the fastener may be mounted. This fastener is provided with fastener non-rotating support engaging means along the periphery of the body 80, such as a plurality of depending point or spur portions 88 that are cut from the body 80 and depressed. In this construction the body and tongues of the fastener are cambered in a frusto-conical manner so that the tongues 81 and 85 are provided with spirally continuous free edges 83 and 87 that substantially conform with the inclination of the threads on a bolt with which the fastener is to be used and the tongues 81 and 85 are put in cantilever thrust when a bolt is tightened thereon. The metal of the tongues 81 and 85 is expanded laterally along the mid-lines thereof, increasingly toward the free ends thereof so that their edges are of normal thickness and abut closely against each other as shown. This provides a fastener having flexible tongue portions that permit a bolt to be thrust abruptly therethru without rotation and that tightens to secure the bolt in place with but a partial turn of the bolt. The lateral abutment of the fastener tongue edges prevents their displacement with respect to each other upon the tightening of the bolt on the fastener.

Figs. 23 and 24 of the drawings illustrate the installation on a bolt of any of the fasteners that are disclosed herein by showing a fastener comprising a body portion 90 that is die cut to provide tongue portions 91. The fastener serves to secure together the two plates 92 and 93 by disposing the curved edges 94 of the free ends of the fastener tongues 91 between adjacent threads 95 on the shaft 96 of a bolt and the bolt tightened thereon. The bolt head 97 is disposed against the lower plate 93 and is provided with tool engaging means such as a screw driver receiving slot 98 or the like so that it may be rotated. Ribs 99 extend longitudinally of the fastener body 90 across the bend lines 100 that are inclined to the midline of the tongues 91 to impart an inclination to the free edges 94 of the tongues 91 that substantially conforms with the inclination of the bolt threads 95. The ribs 99 terminate a desired distance within the tongues 91. The ribs 99 preferably extend in a direction that is substantially parallel with the lateral edges of the body portion 90 and oblique to the bend lines 100. The ends 103 of the fastener body 90 are curved to provide tips 104 that sink into a softer material, such as that of which the plate 92 is made, and restrict the rotation of the junction between the fastener and the plate 92. If preferred, this curved end may be applied to other of the fasteners that are disclosed herein.

It is to be understood that the forms of fastener that are disclosed and shown herein are submitted for the purposes of describing and illustrating the present invention and that the modifications may be interchanged among the various constructions shown where a practical fastener results therefrom without departing from the present invention as defined by the appended claims.

What I claim is:

1. A thin sectioned fastener for engaging and securing a rod-like device, comprising a body portion cambered to provide an elevated central area, said body portion being provided with a pair of tongues having their free ends extending toward each other, and each tongue being attached to said body portion and being bent upwardly therefrom along a line that is inclined with respect to a midline of said tongue to incline the free end of each tongue with respect to the body portion, and each of said tongues being provided with tips at its free end, the edges of which extend in a direction substantially parallel to the bend line.

2. A thin section fastener for engaging and securing a rod-like device, comprising a body portion cambered to provide an elevated central area, said body portion being provided with a pair of tongues having their free ends extending toward each other, and each tongue being attached to said body portion and being bent upwardly therefrom along a line that is inclined with respect to a midline of said tongue and each of said tongues having tips at its free end, the edges of which are substantially parallel to its bend line, and each tongue being provided with an arcuate-shaped edge arranged between its tips which is inclined to said body portion in conformity with the inclination of the bend line that joins the tongue to the body portion.

3. A fastener comprising a body portion provided with a pair of tongues having their free ends extending toward each other, and each tongue being attached to said body portion and being bent upwardly therefrom along a line that is inclined with respect to an edge of said body portion and the free end of each tongue being provided with an edge for engaging an object to be secured by said fastener which edge is inclined with respect to the body portion in conformity with the bend line that joins its tongue to the body portion and a pair of stub tongues having one edge in common alignment, each of said stub tongues being joined at one end to said body portion and having an edge at its free end for engaging the object to be secured by said fastener.

4. A fastener for engaging and securing a threaded bolt, comprising a body portion arched upwardly from opposite edges thereof, said body portion being provided with a pair of tongues having their free ends extending toward each other and each tongue being attached to said body portion and being bent upwardly therefrom along a line that is inclined relative to a midline of said tongue, each of said tongues having a curved edge at its free end for engaging a bolt between adjacent threads thereof which edge is inclined relative to said body portion by the inclination of the bend line of its tongue with the body portion, said fastener being provided with ribs, one of which extends from the body portion across one of said bend lines into one of said tongues and the other of which extends from the body portion across the other bend line into the other tongue, and said body portion having inwardly curved edges for providing sharp corners to engage a supporting member upon which said fastener rests.

5. A fastener for engaging and securing a rod-like device comprising a body portion, said body portion having a pair of aligned tongues attached thereto with their free ends extending toward each other and each end being provided with arcuate-shaped edges to receive between them the rod-shaped device and each tongue being attached to said body portion and being bent upwardly therefrom on a line that is inclined relative to the midline of the tongue to incline the free end of each tongue relative to the body portion and the parts of the free end of each of said tongues being so disposed that a line connecting the termini of its arcuate edge will also be at an angle to the midline of the respective tongues.

6. A fastener for engaging and securing a threaded rod-like device, comprising a body portion provided with a pair of aligned tongues having their free ends extending toward each other and having arcuate-shaped edges to receive between them the rod-shaped device and each tongue being attached to said body portion and being bent upwardly therefrom on a line that is inclined relative to the midline of the tongue to incline the free end of each tongue relative to the body portion and the arcuate-shaped edge at the free end of each tongue being also generally inclined at such an angle to the midline of its respective tongue so that said edges will conform to the pitch of the threads of the rod-like device.

7. A fastener for engaging and securing a threaded rod-like device, comprising a body portion having a pair of aligned tongues with their free ends extending toward each other and having arcuate-shaped edges at their free ends to receive between them the rod-shaped device, and each tongue being attached to said body portion and being bent upwardly therefrom on a line that is inclined relative to the midline of the tongue to incline the free end of each tongue relative to the body portion, said bend lines being substantially parallel to each other and each of the arcuate-shaped edges being generally inclined in the same direction as the bend lines at such an angle to the midlines of the tongues to thereby cause such additional inclination of the edges of each tongue that they will conform to the pitch of the threads of the rod-like device.

8. A fastener for engaging and securing a rod-like threaded device comprising a body portion, said body portion being provided with a pair of tongues having their free ends extending toward each other to receive between them the rod-like device and each tongue being attached to the body portion and at least one of said tongues terminating in a thread-engaging edge and being bent upwardly from said body portion along a line that is inclined relative to its midline so as to incline the tongue relative to the body portion to conform to the pitch of the threads on said device.

9. A fastener for engaging and securing a rod-like threaded device comprising a body portion, said body portion being provided with a pair of tongues having their free ends extending toward each other to receive between them the rod-like device and each tongue being attached to said body portion and terminating in a thread-engaging edge and being bent upwardly from said body portion along a line that is inclined relative to its midline to incline each tongue relative to the body portion to conform to the pitch of the threads on said device.

10. A fastener for engaging and securing a rod-like threaded device comprising a body portion, said body portion being provided with a pair of aligned tongues having their free ends extending toward each other to receive between them the rod-like device and each tongue being attached to said body portion and terminating in a thread engaging edge and bent bent upwardly from said body portion along a line that is inclined relative to its midline to incline each tongue relative to the body portion to conform to the pitch of the threads on said device and said bend lines being substantially parallel to each other so that one tongue will be inclined in a direction opposite to the inclination of the other tongue.

11. A fastener for engaging and securing a rod-like threaded device, comprising a body portion, said body portion having a pair of tongues attached thereto with their free ends extending toward each other to receive between them the rod-like device, and at least one of said tongues terminating in an arcuate-shaped thread-engaging edge and being bent upwardly from said body portion along a line that is inclined relative to its midline to incline the tongue to conform to the pitch of the threads on the rod-like device.

12. A fastener for engaging and securing a rod-like threaded device comprising a body portion, said body portion having a pair of aligned tongues attached thereto with their free ends extending toward each other to receive between them the rod-like device and with each tongue terminating in an arcuate-shaped thread-engaging edge, and each tongue being bent upwardly from said body portion upon a line that is inclined relative to its midline to incline each tongue to conform to the pitch of the threads on the rod-like device.

13. A fastener for engaging and securing a rod-like threaded device comprising a body portion, said body portion having a pair of tongues attached thereto, each having an arcuate-shaped thread-engaging edge at its free end and said tongues being extended toward each other to receive between them the rod-like device and each of said tongues being bent upwardly from said body portion upon a line that is inclined relative to its midline so as to incline each tongue to conform to the pitch of the threads on the rod-like device and said bend lines being substantially parallel to each other so that each tongue will be inclined in a direction opposite to the other.

HUGH T. HUGHES.